United States Patent Office 3,180,877
Patented Apr. 27, 1965

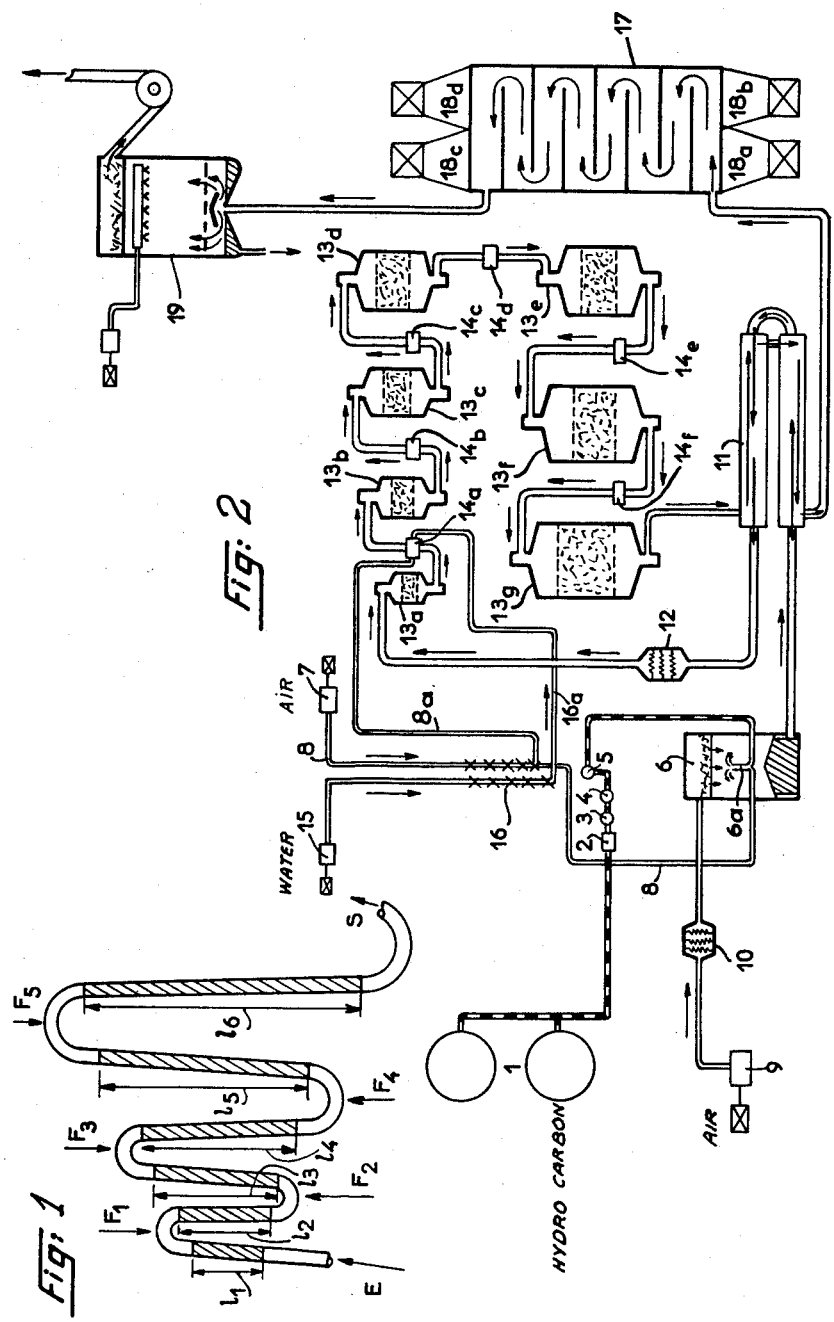

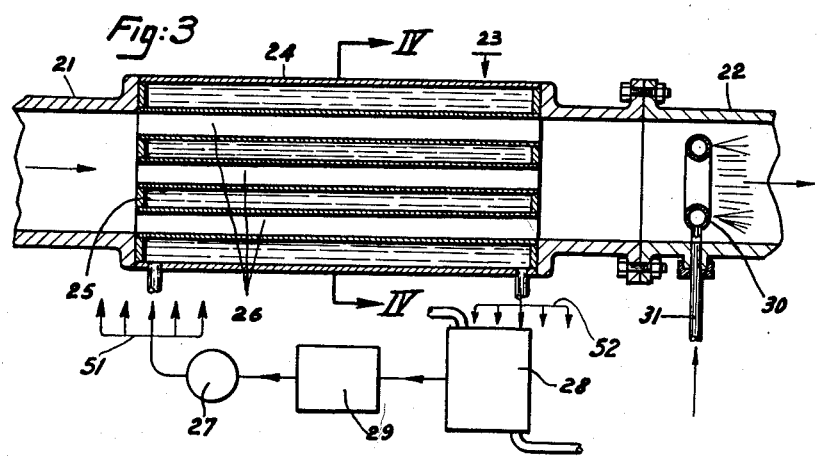
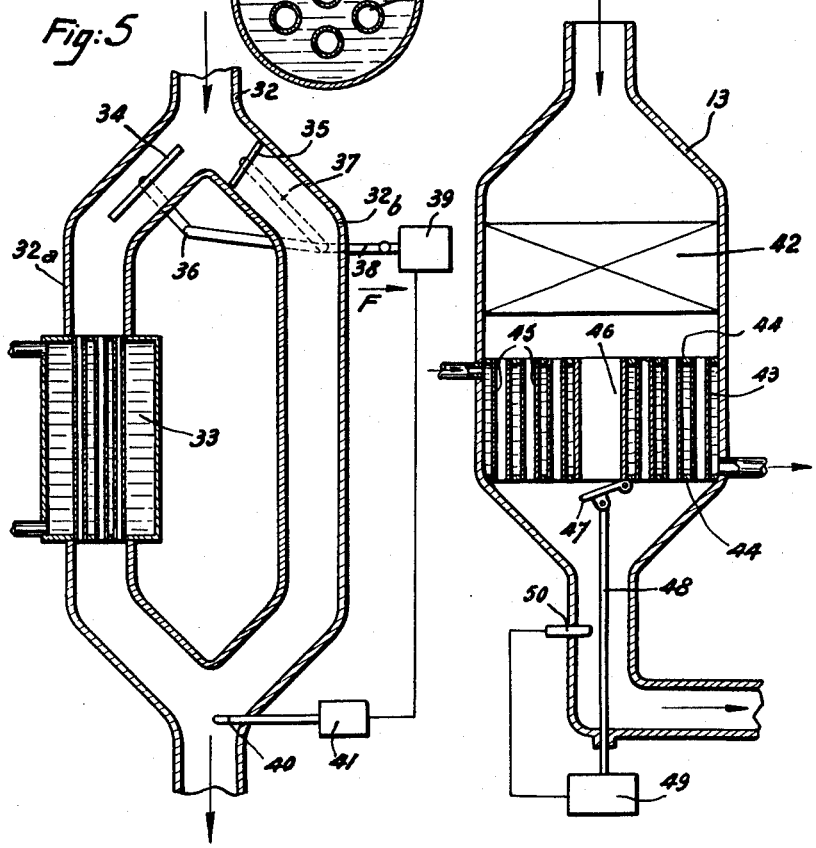

3,180,877
PROCESS FOR THE CATALYTIC OXIDATION OF HYDROCARBONS
Samuel Benichou, Casablanca, Morocco, and Norbert Roger Beyrard and Georges Zimeray, Paris, France, assignors to Societe d'Etudes de Techniques Industrielles Nouvelles, Paris, France, a company of France
Filed Dec. 31, 1962, Ser. No. 248,646
Claims priority, application France, May 23, 1958, 766,362; Apr. 15, 1959, 792,174
13 Claims. (Cl. 260—346.4)

This is a continuation-in-part of application Serial No. 814,905, filed May 21, 1959, now U.S. 3,072,465.

This invention relates to the catalytic oxidation of hydrocarbons.

It is known that many complex products can be obtained by partially oxidising aliphatic or aromatic hydrocarbons in the presence of a catalyst. The oxidising agent is generally atmospheric air and the oxidation is effected in one or more successive catalysing chambers, into which a mixture of hydrocarbon and air is admitted. However, since such mixtures have an explosive character, it is necessary for the initial dilution of the hydrocarbon in air to be relatively low and below a critical value known as the "explosion threshold," above which the danger of spontaneous ignition or explosion of the mixture becomes too great to be acceptable.

Each hydrocarbon thus possesses, in the air, at a given temperature, a critical concentration herein referred to as the "explosion threshold" which it is desirable not to exceed.

Since the catalytic oxidation of hydrocarbons is highly exothermic, the temperature of the mixture of air and hydrocarbon in contact with the catalyst tends to rise rapidly. Now, the temperature at which a given compound is formed is fairly critical. Generally speaking, below this temperature, the degree of oxidation is insufficient, while above it the reaction proceeds with excessive rapidity and may result in a complete oxidation of the hydrocarbon to give water and carbon dioxide or carbon monoxide.

In order to maintain the temperature of the reaction close to the optimum value, it has been proposed to cool the reacting mixture in the catalysing chamber itself. It has also been proposed to operate in a number of successive catalysing chambers and to cool the mixture as it leaves one chamber and before it enters the succeeding chamber. The said cooling may be effected by an injection of liquid water into the duct connecting two successive chambers, water being used because of its high heat of evaporation and of its substantial neutrality to the reaction in progress.

In known processes of this type, the number and the dimensions of the successive chambers are chosen so that the hydrocarbon introduced into the first chamber has become substantially completely exhausted at the delivery end of the last chamber.

The known processes have a relatively poor total output and the utilization of the catalyst (which is the most troublesome element in these installations by reason of the necessity for regeneration and periodical replacement) is far from satisfactory.

It is an object of the present invention to provide an improved process of this type by means of which the total output of the installation can be brought to its optimum value while the catalyst is utilised to the best advantage.

The invention is based upon the observation that if, in the course of catalytic oxidation of a hydrocarbon, the temperature at which the required compound is formed has a fairly precise value, the yield of the oxidation product at temperatures in a range on both sides of this value generally remains adequate, a more or less wide temperature range for the reaction being practical. In other words, if the temperatures are plotted along the abscissae of a graph, and the percentage yields of the conversion into the desired product are plotted along the ordinates, the curve representing this yield has, in the neighborhood of the temperature corresponding to the formation of the desired compound, a more or less flattened maximum, i.e. there is a range of temperature over which it is possible to choose temperature values giving a satisfactory yield.

It is accordingly an object of the invention to constantly maintain the reaction in this temperature range in an installation comprising a succession of catalysing chambers with intermediate cooling.

According to the present invention there is provided a process for the catalytic oxidation of hydrocarbons by means of an oxygen-containing gas to produce an oxidation product of which the maximum yield is obtained between two predetermined temperatures which comprises passing the mixture of hydrocarbon and oxygen-containing gas through a series of catalysing chambers which are interconnected by conduits including cooling means, the quantity of hydrocarbon per unit volume of the mixture being initially chosen to be below the explosion threshold, the number of successive chambers being at most equal to the denominator of that fraction of unity of the said quantity of hydrocarbon, which, when oxidised in each chamber, raises the temperature per unit volume of the mixture from a level substantially equal to the lower temperature existing at the inlet to the said chamber to a level substantially equal to the predetermined upper temperature limit, said chambers being of increasing dimensions and the volume of catalyst in each chamber, at least in respect of the earlier chambers in the series being related to the volume in the preceding chamber by a multiplication factor from 1.05 upwards. The low factor applies to the first pair of chambers; higher factors apply to successive pairs of chambers. The difference between successive factors is small at the lower end of the scale and increases progressively as will be pointed out subsequently, in order to deal with the problem on a practical basis; a number of simplifying assumptions must be made in the design of commercial operations. Such assumptions make it necessary to use values that depart somewhat from the calculated theoretical figures.

When the catalyst completely fills the chambers, it is the volumes of the latter which follow the aforesaid law of progression. In the explanation that follows, reference will sometimes be made to the volumes of chambers, upon the assumption that the chambers are filled with catalyst. In the event that the chamber is not to be completely filled, the chamber must still contain the required amount of catalyst plus the desired excess space.

The following theoretical considerations serve to explain the features of the process according to the invention, and while the applicants do not wish to be regarded as restricted to any particular theory, these features have in fact essentially been confirmed in their value by the experimental results obtained by the applicants in the course of their research.

In the following explanation, reference will be made particularly to the case of the preparation of phthalic anhydride from naphthalene in the presence of a catalyst such as vanadium oxide or molybdenum oxide, it being understood that this example is intended only to aid the explanation of the invention from the theoretical standpoint and is in no way to be regarded as a limitation of the scope of the invention.

The description which follows refers to the accompanying drawings in which:

FIG. 1 is a diagrammatic illustration of an apparatus for the oxidation of hydrocarbon according to the invention.

FIG. 2 is a diagram of a complete apparatus.

FIG. 3 is a longitudinal sectional view of a modified form of a connecting duct between two successive catalysing chambers.

FIG. 4 is a section along the line IV—IV of FIG. 3.

FIGS. 5 and 6 illustrate in section the connection between one chamber and the succeeding chamber in other modified constructions comprising a coolant and a by-pass in the said connection.

By reason of the aforesaid necessity to maintain the initial concentration of the hydrocarbon below the explosion threshold, the reaction generally takes place in the presence of a very large excess of air.

Thus, in the aforesaid case of naphthalene, the initial concentration should not exceed 35 g. (0.28 mol) per cubic meter. It will be noted that the conversion into phthalic anhydride of 0.28 mol of naphthalene requires 1.25 mols of oxygen; 1 cubic meter of air contains 9.5 mols thereof, so that an approximate 8-fold excess of oxygen is present.

It is therefore convenient to assume that, in the course of the reaction, the oxygen concentration does not vary and that, consequently, in a particular temperature zone, the speed of reaction depends only upon the concentration of the hydrocarbon alone.

Such a reaction is called a first order reaction, and it is known that its speed is governed by the differential equation:

$$\frac{dx}{dt} = K(a-x)$$

in which $x$ is the number of hydrocarbon molecules converted by oxidation after time $t$, $a$ is the initial number of hydrocarbon molecules, and $K$ a coefficient depending upon the reaction envisaged, upon the nature of the catalyst and upon the temperature.

If this differential equation is integrated, taking into account the initial conditions ($t=0$, $x=0$), there is found:

$$Kt = \ln \frac{a}{a-x}$$

which gives the quantity of hydrocarbon converted at the end of a time $t$ and which shows that, under given catalyst and temperature conditions, the quantity of oxidised hydrocarbon depends only upon the time $t$, i.e. for a continuous operation in which the mixture circulates substantially at constant speed and pressure, it depends upon the number of catalysing chambers and upon the useful volume of these chambers, that is to say, upon the volume which contains the catalyst in these chambers.

Now, each unit volume of the circulating mixture, for example each cubic meter of air, has substantially a constant specific heat in the course of the reaction, which it is possible to consider as equal to the specific heat of the air, namely about 0.24, having regard to the large excess of air.

In addition, the heat of formation of the desired compound from the chosen hydrocarbon and from oxygen is also known. Thus, in the present example this heat is 3300 large calories per kilogram of oxidised naphthalene.

Assuming that the reaction for the formation of a given compound is possible at any temperature, it is therefore possible to ascertain what would be the total temperature rise of the unit volume of the mixture due to the oxidation of all the hydrocarbon contained in this unit volume. This temperature rise is equal to the quotient of the total calorific power of the unit volume of the mixture by its specific heat.

Thus, in the chosen example, since it is known that one cubic meter of air weighs 1.300 kg., this temperature rise would be:

$$\frac{3300 \times 0.035}{1.300 \times 0.24} = 370 \text{ degrees centigrade}$$

It will be assumed that the reaction will be carried out within a suitable temperature range extending from a value, $Ti$ below the ideal to a value $Ts$ above the ideal. As previously explained, the curve linking yield with reaction temperature is relatively flat at the point of optimum yield in most instances, so that the assumption is a reasonable one. It will be obvious that in a few instances where the curve reaches a substantially sharp peak, the values $Ti$ and $Ts$ must be chosen closer than where the curve is relatively flat, in order to obtain a high degree of efficiency. It is desirable that, each time the temperature of the mixture reaches value $Ts$, this temperature should be reduced to the value $Ti$ before the reaction continues.

In other words, the number $n$ of chambers in each of which a part of the reaction and the heating of the mixture takes place, and between which the temperature must be reduced from $Ts$ to $Ti$ by external cooling means, must be equal to the quotient of the total temperature rise which is possible by the admissible temperature difference:

$$\Delta T = Ts - Ti$$

Thus, in the chosen example of the conversion of naphthalene into phthalic anhydride, the yield is optimum between 350° and 370° C., that is to say, with a temperature difference $\Delta T = Ts - Ti = 20°$ C.

It is deducible therefrom that the optimum number of successive chambers to be employed is $$\frac{370}{20} = 18 \text{ chambers}$$

This obviously supposes that the natural dissipation of heat in the chambers is zero, which is substantially true for apparatus of large capacity located in enclosed buildings. This number must obviously be reduced in the case of small, highly exposed installations, in which the cooling means (for example fins, which are substantially inapplicable to chambers of large volume) can be provided on the walls of the chambers.

Thus, when the heat dissipation of the chambers reaches half the heat evolved therein, the number of chambers must be divided by two.

As previously indicated, $a$ being the quantity of hydrocarbon initially introduced into each cubic meter of air in order that the temperature rise in each chamber may correspond to the difference $Ts - Ti$, it is desirable that the quantity $$\frac{a}{n}$$

of hydrocarbon should be oxidised in each chamber and, for this purpose, that the dimension of each of the chambers should be accordingly determined.

In the successive chambers starting from the first, the quantity $$\frac{a}{n}, \frac{2a}{n}, \frac{3a}{n} \ldots \frac{pa}{n}$$

will be converted in accordance with the aforesaid relation:

$$\ln \frac{a}{a-x} = Kt$$

The times $t_1, t_2, t_3 \ldots t_p$ corresponding to these successive oxidations must therefore correspond to:

$$Kt_1 = \ln \frac{a}{a - \frac{a}{n}} = \ln \frac{n}{n-1}$$

$$Kt_2 = \ln \frac{a}{a - \frac{2a}{n}} = \ln \frac{n}{n-2}$$

$$\vdots$$

$$Kt_p = \ln \frac{a}{a - \frac{pa}{n}} = \ln \frac{n}{n-p}$$

Assuming, as already indicated, that the mixture circulates at constant pressure and speed, the useful volume of the successive chambers must therefore be proportional to:

$$t_1; t_2 - t_1 \ldots t_p - t_{p-1} \ldots$$

If $c$ is a constant dependent upon the pressure and the speed of circulation, the successive volumes $V_1, V_2 \ldots V_p \ldots$ are therefore given by the formulae:

$$V_1 = ct_1 = \frac{c}{K} \ln \frac{n}{n-1}$$

$$V_2 = c(t_2 - t_1) = \frac{c}{K}\left(\ln \frac{n}{n-2} - \ln \frac{n}{n-1}\right) = \frac{c}{K} \ln \frac{n-1}{n-2}$$

$$\vdots$$

$$V_p = \frac{c}{K}\left(\ln \frac{n}{n-p} - \ln \frac{n}{n-p+1}\right) = \frac{c}{K} \ln \frac{n-p+1}{n-p}$$

These formulae show that the volume of the last chamber of order $n$ should be infinite. In practice, this volume will be experimentally chosen having due regard to the fact that, even if this last chamber were entirely omitted, the loss of initial hydrocarbon would not exceed the fraction $$\frac{a}{n}$$

which is smaller as $n$ is larger.

The calculation just made, while having the merit of strict accuracy, has the disadvantage that it does not show the law of progression of the volume of the chambers in a readily understandable manner. This law can be more appropriately shown in the following manner.

A catalytic oxidation apparatus will be considered (FIG. 1) which consists of a tube of constant cross-section in which successive lengths $l_1, l_2 \ldots l_6$ are filled with catalyst with uniform density. Each of these lengths of tube can be regarded as a catalysing chamber of volume proportional to $l_1, l_2 \ldots l_6$. The mixture enters at E and leaves at S and, between the catalysing chambers, there is effected, as diagrammatically indicated by the arrows $F_1 \ldots F_5$, a cooling of the mixture (for example by injection of water) or by other means such as those hereinafter described, so as to lower towards the temperature $Ti$ the temperature of the mixture leaving each of the chambers at a temperature in the neighborhood of $Ts$.

The $(n-1)$ first chambers will be considered, in each of which the fraction $$\frac{a}{n}$$

of hydrocarbon is oxidised.

The mean speed $V_1$ of the reaction in the first chamber $l_1$, that is to say, the speed of the reaction corresponding, in this chamber, to the conversion of the fraction $$\frac{a}{2n}$$

(one half of the total fraction $$\frac{a}{n}$$

oxidised in this chamber) will therefore be $$V_1 = K\left(a - \frac{a}{2n}\right) = Ka\frac{(2n-1)}{2n}$$

There enters the second chamber a mixture in which, in each unit volume of air, the fraction $$\frac{a}{n}$$

has already been converted; the mean speed $V_2$ of the reaction in this second chamber will therefore be $$V_2 + K\left[a - \left(\frac{a}{n} + \frac{a}{2n}\right)\right] = Ka\frac{(2n-3)}{2n}$$

Similarly, there would be obtained in the third chamber:

$$V_3 = K\left[a - \left(\frac{2n}{n} + \frac{a}{2n}\right)\right] = Ka\frac{(2n-5)}{2n}$$

and so on until the antepenultimate $$V_{n-2} = K\left[a - \frac{(n-3)a}{n} - \frac{a}{2n}\right] = Ka\frac{5}{2n}$$

and the penultimate $$V_{n-1} = K\left[a - \frac{(n-2)a}{n} - \frac{a}{2n}\right] = Ka\frac{3}{2n}$$

If W is the speed of circulation of the mixture in the tube T, the tube lengths $l_1, l_2 \ldots l_{n-1}$ are such that the period of contact of the mixture with the catalyst in the chamber of order $p$, i.e.

$$\frac{lp}{W}$$

produces the conversion of the quantity $$\frac{a}{n}$$

of the hydrocarbon at the speed of conversion $V_p$ which has just been established for the corresponding chamber.

Therefore, referring to the successive chambers, we have:

$$V_1 \frac{l_1}{W} = V_2 \frac{l_2}{W} = V_3 \frac{l_3}{W} \ldots = V_{n-1} \frac{l_{n-1}}{W}$$

$$\frac{l_1}{W} Ka \frac{2n-1}{2n} = \frac{l_2}{W} Ka \frac{2n-3}{2n} \ldots = \frac{l_{n-1}}{W} Ka \frac{3}{2n}$$

The lengths $l_1, l_2 \ldots l_{1-n}$, that is to say, the volumes of these chambers which are occupied by the catalyst, must therefore conform to the following law of progression:

$$\frac{l_2}{l_1} = \frac{2n-1}{2n-3}$$

$$\frac{l_3}{l_2} = \frac{2n-3}{2n-5}$$

$$\vdots$$

$$\frac{l_{n-1}}{l_{n-2}} = \frac{5}{3} = 1.67$$

Thus, for a number of chambers at least equal to 5, the ratio of the volume of one chamber to that of the preceding chamber is at least 1.05 and increases so as always to rise to 1.67 between the penultimate chamber $(n-1)$ and that which precedes it.

This result is also very substantially obtained by drawing the ratio of the directly calculated volumes of the chambers $(n-2)$ and $(n-1)$. Thus:

$$\frac{\ln \frac{3}{2}}{\ln 2} \neq \neq 1.70$$

Although strict calculation shows that the $n$th chamber should have an infinite volume for the complete exhaustion of the hydrocarbon, the present approximate calculation (which is equivalent to replacing a logarithmic curve by a succession of tangents) permits of choosing also the volume of $n$th chamber.

There is thus found by applying the same law:

$$\frac{l_n}{l_{n-1}} = 3$$

In other words, if it is desired to obtain a substantially complete exhaustion of the hydrocarbon, it is desirable to give the last chamber three times the volume of the penultimate chamber when the exhaustion of the last fraction $$\frac{a}{n}$$

is of economic interest, taking into account the necessary volume of catalyst.

However, the influence of the heat dissipation by the chambers varies not only their number, but also their progression.

The cooling of the chambers is roughly proportional to their external surface, that is to say, in this instance proportional to $l_1$, $l_2$.

Assuming that, in the chamber $l_1$ the fraction D of the heat Q which is produced escapes through the walls and that nevertheless the temperature difference $\Delta t$ between the inlet and the outlet is equal to $Ts-Ti$, the chamber $l_2$ will under these conditions dissipate the fraction $$\frac{2n-1}{2n-3}D$$

of the quantity of heat produced therein, and the fraction remaining in the chamber will therefore be $$Q\left(1 - \frac{2n-1}{2n-3}D\right)$$

so that the additional quantity of heat $\Delta Q$ dissipated in relation to the first chamber is $$\Delta Q = \left(\frac{2n-1}{2n-3} - 1\right)DQ$$

The length $l_2$ of the second chamber can therefore be increased by a proportional quantity to maintain the difference $\Delta t$. We therefore have:

$$l_2 = l_1 \frac{2n-1}{2n-3}\left[1 + D\left(\frac{2n-1}{2n-3} - 1\right)\right]$$

and so on for the other chambers.

In this expression, D is an experimental datum which varies considerably with the shape of the chambers and their absolute volume (D is smaller as the chambers are larger).

If, however, as previously mentioned, the heat dissipation reaches half the heat evolved: $D = \frac{1}{2}$ and the corrective factor $$1 + D\left(\frac{2n-1}{2n-3} - 1\right)$$

is negligible for the chambers immediately succeeding the first chamber, this factor rises to $$1 - \frac{2}{3} \times \frac{1}{2} = 1.33$$

for the chamber $(n-1)$ in relation to the chamber $(n-2)$. The volume of the latter therefore becomes:

$$l_{n-1} = l_{n-2} \times 1.67 \times 1.33$$
$$= l_{n-2} \times 2.2$$

It will finally be seen that the number of chambers $n$ having been so determined that the quantity $$\frac{a}{n}$$

of initial hydrocarbon is oxidised in each of them, the useful volume of each chamber is derived from that of the preceding chamber by multiplication by a regularly increasing coefficient staggered between 1.05 and 2.2, this coefficient increasing from the second chamber to the last, while an additional chamber of arbitrary volume may be added for the completion of the reaction.

The nature of the hydrocarbon employed and the desired product of oxidation determine the number $n$, but regardless of the reaction employed, the progression of the chambers remains the same as hereinbefore indicated.

There will now be described an example of the application of the invention to the case of the oxidation of naphthalene employing an installation as illustrated in FIG. 2 of the accompanying drawings.

The naphthalene arrives alternately from the two chambers 1 heated by low-pressure steam. It is taken up by pump 2, passes successively through a regulating valve 3, a pressure balancing receptacle 4 and a rotary flow meter for measuring the quantity of naphthalene injected. It then enters the mixer 6, in which it is mixed with air in the proportion of 30 grams per cubic meter. A small quantity of air coming from the compressor 7 under a pressure of 3 kg. through the duct 8, first sprays the hot naphthalene through a nozzle 6a. On the other hand, a rotary compressor 9 having a much higher delivery than the preceding one, feeds the greater part of the air under a superatmospheric pressure of 0.75 kg., through an electric heater 10, which raises its temperature to 140° C. This temperature is necessary for a good atomisation of the naphthalene.

About 60 kg. of naphthalene per hour are thus injected into 2000 m.³ of air. The mixture of air and naphthalene thereafter passes through a heat exchanger 11 of conventional type comprising a cluster of tubes, in which the hot gases arriving from the catalysing chambers and circulating in opposite directions give up some of their calories thereto.

Situated between the said exchanger and the first catalytic converter 13a is an electric heater 12, which in principle is used only for starting the installation and which is placed out of circuit when the reaction has commenced. The heat exchanger is then able to bring the mixture to the required temperature of 350° C.

The mixture of air and naphthalene at 350° C. enters a first catalysing chamber 13a comprising in its upper part, a dust-retaining grid, and then a bed of catalyst in the form of pellets several millimeters in diameter. In passing through the catalyst, a part of the naphthalene is converted into phthalic anhydride and the reaction heat raises the gaseous mixture to about 410°. Before entering the second converter 13b, the said mixture is cooled to 350° C. by an injection of liquid water atomised 14a by means of compressed air coming from the compressor 7 by way of the duct 8a. The water is injected by the pump 15 and the duct 16–16a.

The reaction mixture thereafter successively passes through the other six converters 13b–13g, its temperature being brought in each instance to 350° C. by similar water injections effected at 14–b–c–d–e and –f. The corresponding valves are shown in the duct 16, as also the air valves in the duct 8 of the compressor 7. The various air and water ducts analogous to 6a and 8a have been omitted from the drawing for the sake of clarity.

In this construction, the number of chambers has been made equal to 7 and in this case, as previously indicated, the temperature difference is $$\frac{370}{7} - 50°$$

In addition, by applying the corresponding progression, there are found for the first six chambers volumes proportional to ln 7/6, ln 6/5, ln 5/4, ln 4/3, ln 3/2 and ln 2 i.e., about 0.155, 0.182, 0.223, 0.288, 0.405 and 0.693, the seventh chamber having a volume which may be three times as great as that of the penultimate chamber, namely about 2.08.

In these chambers, the volumes of catalyst (or the weights of catalyst, which is assumed to be homogeneous) are proportional to these numbers.

In the described installation, the total mass of catalyst employed was of the order of 1.5 metric tons.

In the illustrated construction, the various converters are substantially similar to one another but, by analogy with FIG. 1, these converters could have a base of constant cross-section and heights varying in accordance with the law indicated. Also, when the external cooling is negligible and the number of chambers is large (it has hereinbefore been stated that in the case of phthalic anhydride this number would have to be equal to 18), groups of chambers of like volume could be provided and there could be disposed within the latter only that quantity of catalyst which corresponds to the aforesaid law of progression.

The catalysing operation thus effected permits a substantially complete exhaustion of the naphthalene, which is converted into phthalic anhydride in a yield in the neighbourhood of 95%.

This part of the installation comprises in addition (not shown in the figure) a water filter and a control and measuring panel with the various temperature regulating members, a flow meter for measuring the quantity of water injected and the aforesaid regulating valves.

On leaving the last converter, the hot gases pass through the exchanger 11, in which they heat the initial mixture, whereafter they enter an assembly of condensing chambers 17, in which they travel along a sinuous path through twenty successive baffle elements. The chambers consist of ordinary double walled sheet metal cooled by a forced air circulation with the aid of four axial-flow fans 18–a, –b, –c and –d. The gases enter the chambers at a temperature of 155° C. and leave them at 65° C. after having deposited therein the phthalic anhydride produced, as also the impurities formed by the reaction, such as naphthoquinone and maleic acid. The phthalic anhydride collected is thereafter distilled for purification.

On leaving the condensing chambers the air, still containing a small quantity of phthalic anhydride and naphthoquinone, is washed in an ordinary water sprinkler tower 19, in which it is completely freed from the entrained compounds. It is thereafter discharged into the atmosphere. The washing tower is a receptacle about 4 m. high and the sprinkler device comprises 64 water injection nozzles effecting a good atomisation.

The washing water is discarded, because the good catalysis yield obtained in the installation according to the invention, in combination with the effectiveness of the condensing chambers, make it scarcely worthwhile to recover the products contained in the washing water leaving the production cycle.

In the apparatus hereinbefore described, the cooling between two successive chambers is effected solely by means of injected water. The latter, which changes to the form of steam, has the advantage of diluting the mixture and consequently of reducing the danger of explosion. However, this cooling means has, on the other hand, the following disadvantages:

Although the reaction is extremely exothermic, no heat can be recovered therefrom. Moreover, when the product of oxidation must be recovered by condensation on leaving the last chamber, the presence of a considerable quantity of water in the mixture may be troublesome, because if the quantity of steam contained in the mixture is too high it is impossible to cool this mixture sufficiently without the water itself condensing instead of remaining in the form of dry steam permitting direct separation of the oxidation product.

Thus, for example, in the particular case hereinbefore considered, the quantity of water produced by the reaction would make it possible, at the end of the reaction, to lower the mixture to about 35° C., in order to recover the phthalic anhydride without this water condensing, while if water alone is employed to cool the mixture in the course of the reaction the quantity of water contained in the final mixture is such that it is not possible to reduce the temperature below 60° C. without this water condensing. Now at 60° C., the vapor pressure of phthalic anhydride is appreciable, so that some of the product of the reaction is lost. Finally, steam acts as a diluent which increases the volume of the treated mixture.

Preferably, therefore, at least a part of the cooling, between two successive catalysing chambers, is effected by passing this reacting mixture through a cooling heat exchanger.

The dimensions of this heat exchanger may be such that the cooling effected is always slightly insufficient, so that only a small, appropriately adjusted addition of water is required to bring the mixture to the desired temperature.

The heat exchanger is amply dimensioned and is arranged in parallel with a by-pass, so that, in order to bring the mixture leaving one chamber to an appropriate temperature before its entry into another chamber, it is sufficient to adjust the respective proportions of this mixture which pass, on the one hand, through the cooler and, on the other hand, through the by-pass.

The tubular passage shown in FIGURE 3 comprises a portion 21 which is connected to the outlet of one catalysing chamber and a portion 22 which is connected to the inlet of the succeeding chamber. Between these two portions is disposed a cooling heat exchanger 23 which consists, similarly to a fire tube boiler, of an external jacket 24, provided with perforated end plates 25, in which are expanded the tubes 26 through which the treated mixture passes.

The jacket 24 contains a liquid, for example a mineral oil, which is conveyed by a pump 27. The liquid leaving the jacket 24 is passed into a heat exchanger 28, for example for heating the air intended to be introduced in mixture with the hydrocarbon to be oxidised. On leaving the exchanger 28, the liquid is passed into a reservoir 29, from which it is circulated by the pump 27.

Since the progression of the useful volumes of the chambers has in practice the effect of producing equal quantities of heat in each of these chambers, all the exchangers disposed between two consecutive chambers may have equal dimensions and may be connected in parallel with a header 51 connected to the pump 27. Similarly, their outlets may be connected in parallel by a header 52 for admission into the exchanger 28.

The calorific capacity of this cooler is made such that the quantity of heat which it extracts from the mixture is slightly less than that which would be necessary to bring the mixture to the temperature suitable for its admission into the succeeding chamber. A further cooling is effected by water which is injected into the mixture by the ring of orifices 30 which is fed under pressure through the passage 31. The quantity of water may be adjusted as a function of the temperature at the outlet of the cooling exchanger.

In the construction illustrated in FIGURE 5, the channel 32 connecting two consecutive chambers is divided into two parts 32a and 32b, of which first extends through a cooling heat exchanger 33, while the second constitutes a by-pass for this cooler. The butterfly valves 34, 35 control the passage of the mixture through each of the two branches 32a and 32b. The said valves are connected to crank pins 36 and 37 respectively, which are controlled by the linkage 38 and the servo-motor 39. A movement of this linkage in the direction of the arrow F tends to close the valve 34 and to open the valve 35. The servo-motor is controlled by a temperature-responsive element 40 (of the resistance, thermo-electric couple or other type) through an amplifier 41.

When the temperature at the level of the element 40 tends to become excessive, the linkage 38 is moved in the direction corresponding to the closing of the valve 35 and to the opening of the valve 34, and vice versa.

Since the loss of pressure at the passage through the branch 32b is low, while that corresponding to the passage through the exchanger 33 is much higher, a very small variation in the opening of the valve 35 is sufficient to modify considerably the flow through the branch 32b, while a much greater variation in the opening of the valve 34 is necessary for obtaining a variation of the flow through the branch 32a. Consequently, the control crank pins 36 and 37 are advantageously unequal in order that, in the combined movement of the two valves, the angular movement of the valve 34 may be greater than that of the valve 35.

In the construction illustrated in FIGURE 6, a catalysing chamber 13 contains in its upper portion the catalyst 42, which occupies a volume corresponding to the law of progression set forth above and in its lower portion, a heat exchanger 43. The said heat exchanger is, as before, formed of two circular end plates 34 through which there extends the small tubes 45. In addition, it comprises at its center a wide duct 46 which may be closed by a shut-off member 47. The said shut-off member is controlled through the rod 48 by means of a servo-motor 49 which, as before, is controlled by a temperature-responsive member 50 disposed in the outlet of the chamber.

In this case, by reason of the large pressure loss to which the fluid is subjected in passing through the small tubes 45, it is sufficient to adjust the opening of the shut-off member 47 in order to modify the proportion of the mixture flowing, on the one hand, through the exchanger and, on the other hand, through the central duct 46.

The heat recovered by the coolers can also be utilised to fuse the condensed oxidation product obtained at the outlet from the chambers, as also for the distillation of this product (for example phthalic anhydride) in vacuo for the purpose of purifying it.

For the purposes of calculation, we have illustrated the process by describing the production of phthalic anhydride from naphthalene. The process is applicable to the oxidation of other aromatic hydrocarbons such as o-xylene to phthalic anhydride, m-xylene to isophthalic acid, p-xylene to terephthalic acid, benzene to maleic anhydride or to phenol; aliphatic hydrocarbons such as ethylene to acetalhydride, propylene to acrolein, n-butylene to maleic anhydride; and cyclic aliphatic hydrocarbons such as cyclo-hexane to phenol. Thus the process is generally applicable to the catalytic exothermic oxidation of hydrocarbons, volatile at the conditions of oxidation, to oxygen-containing compounds of related structure. The literature is replete with other examples.

In the oxidation of naphthalene in the example given above, a catalyst of 8% $V_2O_5$ deposited on an inert carrier such as silica gel is preferred.

The optimum yield is obtained at about 370° C., but, as indicated, the curve is fairly flat in the range of 350° to 390° C., so that the size of each catalyst bed is designed to raise the temperature from low to high within the range and each cooling stage is designed to reduce the temperature from high to low.

A catalyst of 6% $V_2O_5$ on an inert alumina carrier is also suited for the oxidation of naphthalene as aforesaid, the preferred temperature range being 470° to 520° C. For other hydrocarbons, the percentage of catalyst on the carrier may not be the same. The optimum temperature varies with the hydrocarbon and the product and the catalyst itself may also be changed.

What is claimed is:

1. A process for catalytically oxidizing a hydrocarbon to an oxygenated organic compound wherein the reaction is exothermic, comprising: forming a non-explosive mixture of hydrocarbon vapor and oxidizing gas, advancing the gas and vapor mixture through a plurality of catalyst beds, the number of beds being selected to limit the temperature rise in an individual bed to a predetermined range and cooling the gas and vapor mixtures as it passes from bed to bed to the lower end of said predetermined range, the volume of each successive catalyst bed being larger than that of the preceding bed.

2. The process according to claim 1, wherein the cooling is effected by the injection into the gas and vapor stream of a substance capable of taking up a large amount of heat.

3. The process according to claim 1, wherein the cooling is effected by heat-exchange.

4. The process according to claim 3, wherein the major portion of the cooling is effected by heat-exchange and the remaining cooling is accomplished by the injection of water into the flowing gas and vapor stream.

5. The process according to claim 4, wherein the amount of heat-exchange cooling is regulated by the temperature of the gas and vapor stream after it has been cooled.

6. The process according to claim 4, wherein the amount of water injected into the stream of gas and vapor is relatively fixed while the amount of heat-exchange cooling is regulatable according to the temperature of the flowing stream.

7. The process according to claim 1, wherein a portion of the cooling is accomplished by confining the catalyst beds in chambers provided with walls especially adapted to dissipate heat.

8. The process according to claim 1, wherein the predetermined range is of the order of 20° C.

9. The process according to claim 1, wherein the volumes of all but the last catalyst bed is determined by the relation $$\ln \frac{n}{n-1}, \ln \frac{n-1}{n-2}, \ln \frac{n-2}{n-3} \cdots$$

where $n$ represent the number of beds.

10. The process according to claim 1, wherein the volume of the last catalyst bed is about three times that of the next preceding bed.

11. The process according to claim 1, wherein the hydrocarbon is aromatic.

12. The process according to claim 11, wherein the hydrocarbon is napthalene and the principal product is phthalic anhydride.

13. The process of continuously oxidizing a hydrocarbon comprising: forming and advancing a mixture of a hydrocarbon with an oxidizing gas; maintaining the rate of formation and advancement of said mixture constant at a predetermined volume per unit of time; subjecting said advancing mixture to the action of a catalyst favoring oxidation of said hydrocarbon; repeating said catalytic action in a plurality of consecutive stages, each of said stages having larger volume and more catalyst than the next preceding stage; limiting the reaction in each stage to a predetermined temperature rise, and cooling the mixture between stages to a predetermined entry temperature for the next stage.

References Cited by the Examiner
UNITED STATES PATENTS

| 2,117,359 | 5/38 | Porter | 260—346.4 |
| 2,954,385 | 9/60 | Burney et al. | 260—346.4 |
| 3,072,682 | 1/63 | Benichou et al. | 260—346.4 |

FOREIGN PATENTS

| 1,209,169 | 2/50 | France. |

NICHOLAS S. RIZZO, *Primary Examiner.*

WALTER A. MODANCE, *Examiner.*